US006638331B2

(12) United States Patent
Hettmann

(10) Patent No.: US 6,638,331 B2
(45) Date of Patent: Oct. 28, 2003

(54) INTAKE ARRANGEMENT FOR THE COMBUSTION AIR OF AN INTERNAL COMBUSTION ENGINE

(75) Inventor: Heinz Hettmann, Schorndorf (DE)

(73) Assignee: Andreas Stihl Ag & Co., Waiblingen (DE)

( * ) Notice: Subject to any disclaimer, the term of this patent is extended or adjusted under 35 U.S.C. 154(b) by 0 days.

(21) Appl. No.: 10/162,907

(22) Filed: Jun. 6, 2002

(65) Prior Publication Data

US 2002/0189212 A1 Dec. 19, 2002

(30) Foreign Application Priority Data

Jun. 13, 2001 (DE) ........................................ 101 28 791

(51) Int. Cl.[7] ................................................ B01D 59/50
(52) U.S. Cl. ........................................................ 55/337
(58) Field of Search .......................... 55/309, 321, 337, 55/346, 347, 349, 385.3; 123/198 E

(56) References Cited

U.S. PATENT DOCUMENTS 3,877,454 A * 4/1975 Axmann et al. ........ 123/198 E
4,204,848 A 5/1980 Schulmeister et al.
4,537,608 A * 8/1985 Koslow ....................... 55/337
5,183,017 A 2/1993 Bopp
5,320,653 A * 6/1994 Morgan et al. ............... 55/337

FOREIGN PATENT DOCUMENTS

DE 25 50 165 5/1976
EP 558091 A1 * 9/1993

* cited by examiner

*Primary Examiner*—Robert Hopkins
(74) *Attorney, Agent, or Firm*—Walter Ottesen

(57) ABSTRACT

The invention relates to an intake arrangement for the combustion air (2) of an internal combustion engine (3) in a portable handheld work apparatus such as a cutoff machine, a motor-driven chain saw or the like. Combustion air is supplied to an air filter (6) via a first centrifugal-force separator (4). The air filter (6) is charged with a carrier airflow (8) in addition to combustion air and the carrier flow (8) contains coarser particles (9) which function to build up a filter cake (26) on the air filter (6). In this way, a low maintenance continuous operation of the intake arrangement is made possible especially when the ambient air is heavily laden with dust.

16 Claims, 2 Drawing Sheets

INTAKE ARRANGEMENT FOR THE COMBUSTION AIR OF AN INTERNAL COMBUSTION ENGINE

BACKGROUND OF THE INVENTION

German Patent 2,550,165 discloses an intake arrangement for combustion air which drives a portable hand-guided work apparatus, namely, an air cushioned lawnmower. The intake arrangement comprises a cylindrical housing wherein an intake airflow is tangentially guided. The cylindrical housing serves as a centrifugal-force separator for separating and discharging contaminants in the inducted air. The air filter is connected to the center of the centrifugal-force separator wherein the precleaned air is guided. The air filter comprises a thick-walled fine filter which requires an application of oil in order to filter out fine dust. The intake arrangement requires continuous control and maintenance, especially when the intake air is heavily laden with dust.

SUMMARY OF THE INVENTION

It is an object of the invention to provide an intake arrangement for the combustion air of an internal combustion engine of a portable handheld work apparatus which has a high service time with low maintenance.

The intake arrangement of the invention is for combustion air of an internal combustion engine including an internal combustion engine of a portable handheld work apparatus wherein the combustion air drawn toward said engine is laden with dust. The intake arrangement includes: an air filter mounted upstream of the engine for separating the dust from the combustion air; a centrifugal-force separator for receiving a flow of combustion air and for dividing the flow into a central core flow having essentially fine particles of the dust and a tangential flow surrounding the central core flow; the air filter being connected to the centrifugal-force separator so as to cause the central core flow to flow to the air filter; and, supply means for supplying a carrier airflow containing coarse particles of the dust to the air filter to permit the coarse particles to build up a filter cake on the air filter to separate out the fine particles in the central core flow.

The low-dust core flow of the centrifugal-force separator conducts essentially the finest particles. In addition to the core flow, the air filter is charged with an additional carrier airflow which conducts coarse particles in coarsely pregiven quantities. The particles have a mean grain diameter which is suitable to build up a filter cake on the air filter. The filter cake functions to separate the finest particles in the core flow of the centrifugal-force separator which is directed to the air filter. The additional carrier airflow is practically formed by the tangential flow of a further centrifugal-force separator. The core flow is understood to be the gas flow or airflow which flows axially about the longitudinal center axis of a centrifugal-force separator; whereas, the tangential flow moves radially outside of the core flow and tangentially and axially along the inner wall surface of the casing or housing of the centrifugal-force separator. Because of the centrifugal forces, larger particle fractions are present in the tangential flow than in the core flow wherein only the finest particles having low mass and small diameter are present.

In this way, an intake arrangement for the combustion air of an internal combustion engine is provided which operates in accordance with the cake-filtration principle notwithstanding a centrifugal-force separation upstream of the air filter. The maintenance intervals of the air filter are significantly extended in this way. The intake arrangement saves space and can be configured of an air filter and one or several centrifugal-force separators for use in portable handheld work apparatus. Preferably, cylindrically-shaped axial cyclones having an axial air feed are used as centrifugal-force separators. It can also be practical to configure the centrifugal-force separators as cyclones having a cylindrical housing section and thereafter a conically tapering housing or even as a turbofilter.

A spin flow is present during operation in the centrifugal-force separator. The spin flow can be effected in that the particular intake opening of the centrifugal-force separator is arranged tangentially on the housing thereof while the clean air exit is arranged axially on the housing. A spin flow can also be effected by corresponding gas or air conducting elements at the air entry or in the interior of the centrifugal-force separator.

The carrier airflow, which is additionally applied to the air filter and mostly has coarse particles, is advantageously picked up via a suitably shaped dip pipe which the tangential flow surrounds in the interior of the second centrifugal-force separator. It can be practical to take off the additional carrier airflow with a dust channel opening tangentially at the second centrifugal-force separator. In this way, mostly coarse particles having a larger grain diameter are supplied to the air filter. The air filter is mounted downstream of the centrifugal-force separators and is connected in series therewith. In this way, a filter cake can be built up on the air filter after the engine of the work apparatus is started and this filter cake separates even the finest particles from the combustion air. In this way, a permanent, minimum service operation of the engine is provided and the effectively purified combustion air is substantially free of abrasive fine dust when entering the engine.

A compact intake arrangement comprises two first centrifugal-force separators and a second centrifugal-force separator as well as an air filter. The centrifugal-force separators are fluidly connected to each other so that the core flows of the first centrifugal-force separators and the tangential flow of the second centrifugal-force separator are supplied to the air filter.

A blower is used to generate an airflow through the centrifugal-force separators. The blower can be the cooling fan of the engine. In this way, the intake work of the engine can also be reduced. The air filter is connected to the dip pipes of the first centrifugal-force separators and to the dust channel of the second centrifugal-force separator. To discharge the dirt particles from the intake arrangement, a fluid connection of the tangential flows of the first centrifugal-force separators and the core flow of the second centrifugal-force separator to the inlet of the blower is provided. The air filter can be configured as a simple membrane filter, preferably as a flat paper membrane.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
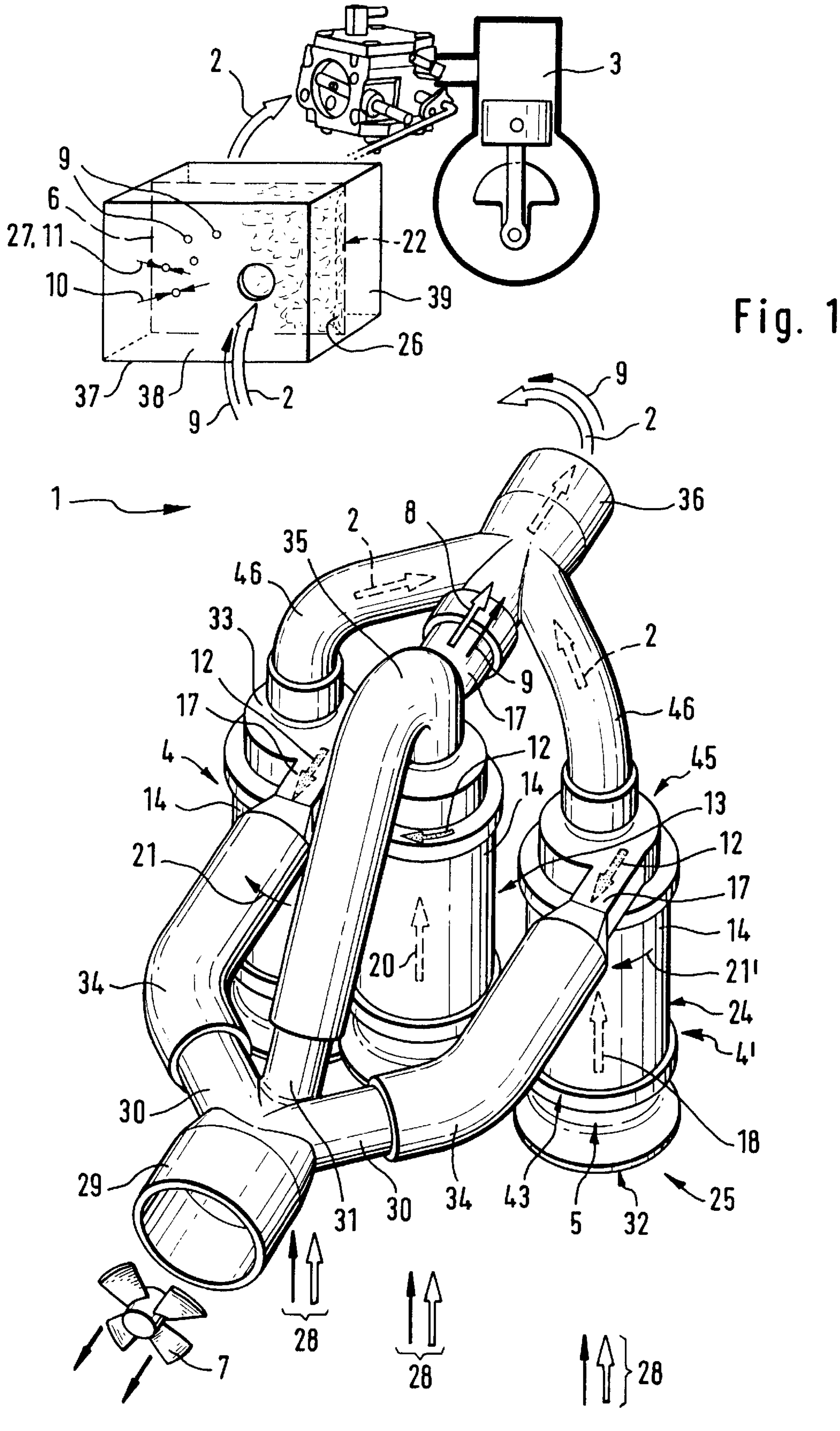
FIG. 1 is a perspective view of an embodiment of the intake arrangement according to the invention which includes three centrifugal-force separators and an air filter; and, FIG. 2 is a perspective view of an individual centrifugal-force separator.

FIG. 1 shows a schematic view of an intake arrangement 1 for the combustion air 2 for a schematically represented internal combustion engine 3. The internal combustion engine 3 serves for driving a work tool of a portable handheld work apparatus such as a cutoff machine or the like. The air filter 6 is configured in accordance with the principle of an air filter 6 operating with cake filtration. In this way, an intake arrangement 1 is provided in a simple manner which is low on maintenance and makes possible a long-term operation. Three centrifugal-force separators (4, 4', 13) are assigned to the air filter and are connected upstream thereof.

In the embodiment shown, the centrifugal-force separators (4, 4', 13) are configured as axial cyclones 14 each having a cylindrical housing 24. To realize the flattest form possible of the group 25 of centrifugal-force separators (4, 4', 13), two first centrifugal-force separators (4, 4') for making available prepurified or precleaned combustion air 2 are arranged in parallel with a second centrifugal-force separator 13 which is arranged therebetween. The second centrifugal-force separator 13 functions to make available a carrier airflow 8 for the air filter 6. The carrier airflow 8 is fixedly pregiven or adjustable in volume. The carrier airflow 8 contains mostly coarse particles 9 which serve to build up a filter cake 26 on the air filter 6 whereby a separation of the finest particles at the air filter is made possible. The finest particles would flow through the air filter 6 but for the filter cake 26 and would contribute to wear on the running surfaces and bearings in the interior of the engine 3. An airflow having dust-laden ambient air 28 is caused to flow through all centrifugal-force separators (4, 4', 13). The airflow is generated by a blower 7, which is preferably a cooling air fan of the engine. The ambient air 28 contains solid particles having differently large grain diameters.

A collection stub 29 at the blower end branches into three suction stubs (30, 31) at the suction end. The suction stub 31 is arranged in the center between the two outer suction stubs 30. The centrifugal-force separators (4, 4', 13) have inlet openings 32 at an axial end 43 of their housings 24. Ambient air 28 can enter through the inlet openings 32 in the axial direction. The centrifugal-force separators (4, 4', 13) are closed off by discharge volutes 33 at the ends 45 lying axially opposite the inlet openings 32. The cover-shaped discharge volutes 33 are penetrated axially and centrally by respective dip pipes 15 (see FIG. 2). In addition, each discharge volute 33 has a tangentially extending dust channel 17. The dust channels 17 of the outer centrifugal-force separators (4, 4') are connected to the suction stubs 30 of the collecting stub 29 with the aid of pipe elbows 34. The dip pipe 15 of the center centrifugal-force separator 13 is, in contrast, connected to the section stub 31 via a pipe elbow 35.

The dip pipes 15 of the two outer centrifugal-force separators (4, 4') are joined by means of pipe elbows 46 to the dust channel 17 of the center centrifugal-force separator 13 in a collecting stub 36 at the air filter end.

The collecting stub 36 is fluidly connected to the air filter housing 37. The air filter housing 37 is partitioned in the interior by the air filter 6 into a contaminant space 38 and a clean space 39. The contaminant space 38 is therefore charged by precleaned combustion air 2 of the first centrifugal-force separators (4, 4') and is charged by the carrier airflow 8 at a pregiven volume with particles 9. Particles 9 are supplied in this way to the air filter 6 which build up a closed particle layer or filter cake 26 via which fine and finest particles in the precleaned combustion air are prevented from passing through the air filter 6. It is practical to configure the air filter 6 as a membrane 22 or paper membrane.

Via the dust channels 17 and the pipe elbows 34 of the first centrifugal-force separators (4, 4'), the blower 7 moves their tangential flows (21, 21') and a core flow 20 of the second centrifugal-force separator 13. The tangential flows (21, 21') move rotationally and axially in the interior of housing 24 from the inlet openings 32 to the dust channels 17. The tangential flows (21, 21') contain the larger dust quantity components than the respective core flows which these tangential flows surround in the interior of the housing 24. In this way, the largest dust quantity is conducted away to the ambient of the engine or portable handheld work apparatus by the blower 7 before entry into the air filter housing 37. In this way, the air filter 6 is prevented from rapidly clogging because of a large dust quantity. A low maintenance operation over a long operating duration of the intake arrangement is thereby effected.

Figure 2:
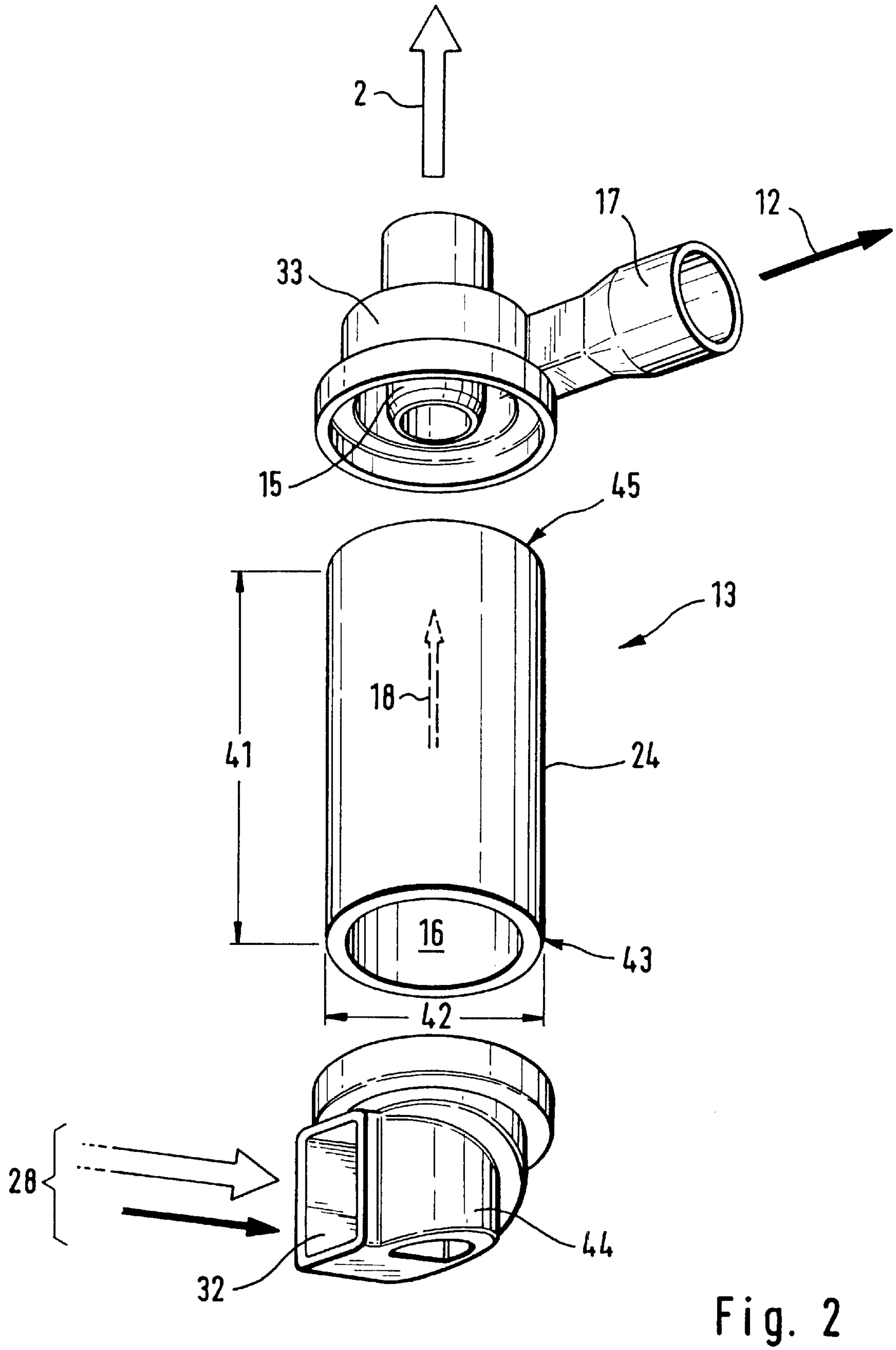

FIG. 2 shows a perspective view of a centrifugal-force separator 13 configured as a tangential cyclone. The tangential cyclone is shown in an exploded view and comprises a cylindrical housing 24 or separator tube whose axial length 41 is approximately twice its outer diameter 42. A tangential inlet 44 is formed of plastic at the axial end 43 of the separator tube 24. The tangential inlet 44 has an inlet opening 32, which has a rectangular-shaped cross section, for the tangential supply of the ambient air 28. The tangential inlet 44 is configured as a socket at its axial end facing toward axial end 43. In the assembled state of the tangential cyclone, the socket-like end of the tangential inlet 44 is fixed seal-tight on the separator tube 24. This can be achieved utilizing adhesive or a form-tight, force-tight or material-tight connection can be achieved in some other way.

The axial end 45 of the housing 24 lies opposite the end 43. At this end 45, the discharge volute 33, which is described in FIG. 1, is provided and defines an end of the housing 24. The discharge volute has a dip pipe 15 and a dust channel 17 which projects tangentially and transversely to the dip pipe 15. An end of the discharge volute, which faces the end 45, is configured with a socket in the manner of the tangential inlet 44 and is fixed to the housing 24. In the embodiment shown, the discharge volute is formed in one piece as a plastic component having the dip pipe and the dust channel. The same components, material flows and their particles are identified with the same reference numerals as in FIG. 1.

It is understood that the foregoing description is that of the preferred embodiments of the invention and that various changes and modifications may be made thereto without departing from the spirit and scope of the invention as defined in the appended claims.

What is claimed is:

1. An intake arrangement for combustion air of an internal combustion engine including an internal combustion engine of a portable handheld work apparatus, the combustion air drawn toward said engine being laden with dust, the intake arrangement comprising:

an air filter mounted upstream of said engine for separating said dust from said combustion air;

a centrifugal-force separator for receiving a flow of combustion air and for dividing said flow into a central core flow having essentially fine particles of said dust and a tangential flow surrounding said central core flow;

said air filter being connected to said centrifugal-force separator so as to cause said central core flow to flow to said air filter; and, supply means for supplying a carrier airflow containing coarse particles of said dust to said air filter to permit said coarse particles to build up a filter cake on said air filter to separate out said fine particles in said central core flow.

2. The intake arrangement of claim 1, wherein said flow of combustion air is a first flow and said centrifugal-force separator is a first centrifugal-force separator; said supply means including a second centrifugal-force separator for receiving a second flow of combustion air and for dividing said second flow into a second central core flow and a second tangential flow containing said coarse particles of said dust; and, said air filter is connected to said second centrifugal-force separator so as to cause said second tangential flow to flow to said air filter as said carrier airflow.

3. The intake arrangement of claim 1, wherein said second centrifugal-force separator is a cyclone.

4. The intake arrangement of claim 3, wherein said second centrifugal-force separator is an axial cyclone.

5. The intake arrangement of claim 3, wherein said flow of combustion air is a first flow and said centrifugal-force separator is a first centrifugal-force separator; said supply means including a second centrifugal-force separator for receiving a second flow of combustion air and for dividing said second flow into a second central core flow and a second tangential flow containing said coarse particles of said dust; and, said second centrifugal-force separator has a dip tube in the interior thereof; and, said carrier airflow is taken from said dip tube.

6. The intake arrangement of claim 2, wherein said second centrifugal-force separator has a dust channel projecting tangentially therefrom for conducting said carrier airflow therefrom and toward said air filter.

7. The intake arrangement of claim 1, further comprising a blower for generating a flow of ambient air laden with dust through said centrifugal-force separator.

8. The intake arrangement of claim 7, wherein said blower is a cooling air fan of said engine.

9. The intake arrangement of claim 1, wherein said air filter is configured as a membrane.

10. The intake arrangement of claim 1, wherein said air filter is configured as a paper membrane filter.

11. An intake arrangement for combustion air of an internal combustion engine including an internal combustion engine of a portable handheld work apparatus, the combustion air drawn toward said engine being laden with dust, the intake arrangement comprising:

an air filter mounted upstream of said engine for separating said dust from said combustion air;

a group of three centrifugal-force separators including a left-hand centrifugal-force separator, a middle centrifugal-force separator and a right-hand centrifugal-force separator with each of said centrifugal-force separators receiving a flow of air;

each of said centrifugal-force separators dividing its flow of air into a central core flow having essentially fine particles of said dust and a tangential flow surrounding said central core flow having essentially coarse particles; and, said centrifugal-force separators being so fluidly connected to each other that the central core flows of said left-hand and right-hand centrifugal-force separators and the tangential flow of said middle centrifugal-force separator are all directed to said air filter.

12. The intake arrangement of claim 10, further comprising a blower for generating a flow of ambient air laden with dust through said centrifugal-force separators.

13. The intake arrangement of claim 12, wherein said blower is a cooling-air fan of said engine.

14. The intake arrangement of claim 11, further comprising a blower for removing the tangential flows of said left-hand and right-hand centrifugal-force separators and said center flow from said middle centrifugal-force separator.

15. The intake arrangement of claim 11, wherein said air filter is configured as a membrane.

16. The intake arrangement of claim 11, wherein said air filter is configured as a paper membrane.

* * * * *